Patented Dec. 18, 1951

2,578,943

UNITED STATES PATENT OFFICE 2,578,943

METHOD OF TREATING GELATIN CAPSULES AND PRODUCT RESULTING THEREFROM

Blasey T. Palermo and Shelby C. McMillion, Detroit, Mich., assignors to R. P. Scherer Corporation, Detroit, Mich., a corporation of Michigan No Drawing. Application March 5, 1949, Serial No. 79,908

5 Claims. (Cl. 117—118)

1

This invention relates to gelatin capsules adapted to contain liquid or gelatinous or viscous or granular material.

Conventional capsules made up of a composition consisting of gelatin, glycerin and water are relatively weak when first made. At this time the capsules retain the original water content of the composition used in making up the capsules. By drying, the capsules are rendered stronger. Under conditions of high humidity, the dried capsules tend to absorb moisture which renders the capsules flaccid or flabby. In other words, or such reabsorption of moisture, the capsules lose their resiliency. The reabsorption of moisture is accompanied by swelling, often to an objectionable extent.

We have now provided a method for treating gelatin capsules yielding a relatively high strength under conditions of low humidity and resulting moisture content and capable of reabsorbing moisture without loss of resiliency although such reabsorption renders the capsules weaker, i. e. breakable when subjected to relatively low pressures. Further, the capsules of the present invention can reabsorb water without objectionable swelling.

For carrying out the methods of the present invention, we may start with gelatin capsules prepared and filled by any conventional method, for instance, that disclosed in the patent to Scherer No. 1,970,396. The filled capsules are subsequently treated with a composition containing formaldehyde and thereafter dehydrated. The gelatin to plasticizer ratio in the capsules, the concentration and amount of the formaldehyde employed and other factors are adjusted as disclosed in greater detail hereinbelow, to confer on the capsules the desired strength under predetermined humidity conditions. Thus, we can treat the capsules to render them relatively strong under conditions of low humidity but relatively weak under conditions of high humidity. The so treated capsules are all relatively strong when first made, and retain their resiliency in spite of variations in breaking strength.

It is therefore an important object of the present invention to provide a method for treating gelatin capsules to render the capsules initially strong, resilient under various humidity conditions, characterized by relatively low strength under high humidity conditions and capable of absorbing moisture without undue swelling.

Another object of this invention is to provide a method of treating gelatin capsules for the purpose indicated and comprising subjecting capsules of adjusted gelatin and plasticizer ratio to the action of formaldehyde of specific concentration and in specific amounts followed by dehydration.

Other and further objects and features of the present invention will become apparent from the following description and appended claims.

In the following description, particular reference is made to the preparation of 6½ minim capsules, although, obviously, capsules of other sizes may be made by the same methods. The strengths of these 6½ minim capsules are defined, inter alia, in terms "dry" breaking strength and "wet" breaking strength. By the term "dry" breaking strength we mean the force (in grams) required to break a capsule when applied parallel to the plane of sealing of the capsules (along the major axis of capsules prepared by the method of said Scherer patent) after the capsule has been treated with a formaldehyde containing composition, dried, for instance, at 80° F. and a relatively humidity of 25% and thereafter kept in air at 25% relative humidity. By the term "wet" breaking strength we mean the force (in grams) required to break a capsule when applied normally to the plane of sealing of the capsule after the capsule has been treated with a composition containing formaldehyde, dried, say, at 80° F. and a relative humidity of 25% and thereafter exposed, say, for 4 hours to an atmosphere of 80% relative humidity.

Filled capsules are first prepared by any suitable conventional method, for instance, that of the above mentioned patent to Scherer. The gelatin to plasticizer ratio of these capsules is maintained within limits disclosed hereinbelow. Especially when proceeding according to the method of said Scherer patent, the fresh filled capsules carry a thin film of oil. Although it is possible to remove this oil film, as by washing with naphtha, and also to dry the washed capsules slightly, we prefer to treat the fresh capsules in their original fresh condition. The thin oil film does not interfere with the subsequent treatment with the formaldehyde-containing composition disclosed hereinbelow, and actually serves the useful purpose of preventing adhesion between the fresh capsules which occasionally has been noted after removal of the oil film and before treatment with a liquid medium containing formaldehyde.

The mass of freshly prepared filled capsules obtained as described are next tumbled with an emulsion of formaldehyde in an oily medium. The amount and composition of this emulsion and the time of tumbling are disclosed in greater detail hereinbelow. Preferably, the capsules are first placed in any suitable conventional tumbler and, while the capsules are being tumbled, the emulsion is added and tumbling continued until the action of the emulsion has been completed to the desired extent. Then sponges (which may be saturated with naphtha) may be placed in the tumbler and the tumbling may be continued, for removing the oily emulsion from the capsules. The capsules may then be dried, for instance, at 80° F. and 25% relative humidity for 72 hours, or in any other manner, until the desired "dry" breaking strength has been reached. Thereafter the capsules may be stored in a dry atmosphere (say, 25% relative humidity) to prevent reabsorption of moisture which would reduce the breaking strength, if such reabsorption is not desired.

The gelatin:plasticizer ratio and the effects due to variation thereof will be discussed in detail hereinbelow. Nevertheless, it should be noted at this time that a plasticizer is required and that the plasticizer employed is a polyhydric alcohol such as sorbitol or, in particular, glycerin. The resiliency of conventional gelatin capsules is due at least in part to their glycerin content. The tendency of conventional gelatin capsules to absorb moisture (with resultant swelling and loss of resiliency) after drying is likewise due to their glycerin content. Such swelling and loss of resiliency also takes place when ordinary gelatin capsules are exposed to aqueous formaldehyde solutions, whether concentrated or dilute, as by dipping, immersion, tumbling, spraying or otherwise. For this reason, we do not treat the gelatin capsules with an aqueous formaldehyde solution but use instead an emulsion of an aqueous formaldehyde solution in a liquid medium immiscible with water. The dispersed or emulsified formaldehyde solution is quite concentrated, being at least of 10% strength and preferably 35% or more. The liquid medium in which the formaldehyde solution is emulsified is preferably of limited or no volatility, so that the emulsion can be preserved and used without change in concentration of CHOH (100% gaseous formaldehyde) due to evaporation of the dispersing medium. Examples of such water-immiscible liquids are the mineral and vegetable hydrocarbon and glyceride oils such as olive oil and light mineral oil. Glycerin dioleate may also be used. Any suitable emulsifying agent may be used in an amount effective to disperse the formaldehyde solution. Ordinarily from about 5% to about 30% of emulsifying agent will suffice. Examples of such emulsifying agents are lanolin (the preferred emulsifying agent), lecithin, and the compounds of specific examples I to V of the patent to Katzman et al. No. 2,178,174. The ratio of formaldehyde solution to the dispersing medium or the total formaldehyde solution content of the emulsion will be discussed hereinbelow.

As disclosed, emulsifying an aqueous formaldehyde solution in an oily medium serves to reduce the water concentration in the composition employed to treat the gelatin capsules and thereby prevents absorption of excessive amounts of water by the capsules, at least before the capsules have been modified by the action of the formaldehyde. At the same time, the CHOH concentration in the dispersed formaldehyde solution is quite high so that the CHOH reacts readily with the gelatin capsules and all the capsules in one batch being treated receive the same treatment, i. e. their breaking strengths will be the same. While the water concentration in an aqueous formaldehyde solution can be reduced by dilution with an organic solvent miscible with water, for instance, acetone, we have noted that when aqueous formaldehyde solutions diluted with acetone are used to treat a batch of gelatin capsules, the thus simultaneously treated capsules do not consistently exhibit the same breaking strengths. We attribute this fact to the low CHOH concentration after dilution of the formaldehyde solution with acetone which we believe brings about slow and irregular action of CHOH on the gelatin.

Thus, a distinction should be made between an emulsion of an aqueous formaldehyde solution and a formaldehyde solution diluted with an organic water miscible solvent. The emulsion and the solution may both have the same total CHOH concentration, but the emulsion will have its CHOH content confined to a single phase of the two phases present, while the diluted solution will have its CHOH content dissolved in the total amount of liquid present. Thus, the CHOH is more concentrated and more reactive in the emulsion.

Another advantage flowing from the use of the emulsion is to be found in the fact that no oil removal by washing (as with naphtha) is required in the case of freshly prepared capsules which can immediately be treated with emulsion.

Treatment of the capsules with the emulsion by way of tumbling is preferred, since by tumbling uniform contact of even small amounts of emulsion with the capsules can be brought about. Thus, small amounts of emulsion can be used that are spent by tumbling with a single batch of capsules, and the problem of reuse of emulsion is eliminated. Nevertheless, if desired, the capsules may be dipped in emulsion, or agitated with an excess of emulsion, as long as provision is made for intimate contact and relative displacement as between capsules and emulsion.

The effect of the emulsion content of 37% aqueous CHOH is illustrated hereinbelow in the case of capsules made up from a composition containing 27% gelatin, 47.5% glycerin and 25.5% water. 20,000 filled 6½ minim capsules freshly made from this composite were tumbled with 200 grams emulsion for 30 minutes. The emulsion contained 20% lanolin and 37% aqueous CHOH in the amounts tabulated hereinbelow, the remainder being light mineral oil. For comparison, one batch of capsules was not tumbled with emulsion. After tumbling with emulsion, the capsules were tumbled with naphtha-soaked sponges and dried at 80° F. for the tabulated periods of time. The breaking strength of the capsules were determined before, during and after drying. The "wet" breaking strengths were determined after 90 hours drying and 24 hours exposure to an atmosphere of 80% relative humidity.

Table 1

| Drying Time, in Hours | Breaking Strength, in Grams | | | | |
|---|---|---|---|---|---|
| | Treated Capsules (Conc. of 37% CHOH in emulsion) | | | | Untreated Capsules |
| | 75% | 50% | 25% | 10% | |
| 0 | ----- | 6,470 | ----- | ----- | 2,000 |
| 16 | 700 | 2,400 | 3,000 | 9,000 | 10,000 |
| 24 | 500 | 2,000 | 2,000 | 10,000 | 9,000 |
| 40 | 400 | 1,800 | 2,000 | 12,000 | 10,000 |
| 90 | 500 | 1,250 | 1,900 | 12,000 | 9,000 |
| 90+24 [1] | 200 | 420 | 400 | 8,000 | ----- |

[1] At 80% R. H.

The above tabulated data illustrate a number of features of the methods of the present invention (involving treatment of gelatin capsules with an emulsion of aqueous formaldehyde). First, the data show that, immediately after tumbling and before drying, the treated capsules are much stronger than those not treated. Secondly, there is no very pronounced difference between "dry" and "wet" breaking strength unless the formaldehyde solution content of the emulsion exceeds 10%. Actually, when it is desired to prepare capsules having a "dry" breaking strength distinctly greater than the "wet" breaking strength, the emulsion should contain more than 20% formaldehyde solution. At lower formaldehyde solution contents in the emulsion, the treated capsules are much stronger than untreated capsules before drying, while after drying the difference in strength as between treated and untreated capsules is not quite so striking, although the treated capsules still are distinctly stronger than the untreated capsules. Further, at emulsion contents of formaldehyde solution less than 20%, the "wet" breaking strengths of the treated capsules, while only slightly, if at all, below the "dry" breaking strength of the treated capsules, is much greater than that of the untreated capsules, which lose their resiliency on exposure to moisture. Thirdly, in the case of capsules treated with emulsions containing 20% or more formaldehyde solution, there occurs a progressive reduction in "dry" breaking strength after more than 16 hours of drying, while this is not true of capsules treated with emulsions containing less formaldehyde solution or of untreated capsules. Finally, when the emulsion contains more than 20% of formaldehyde solution, increasing the formaldehyde solution content of the emulsion reduces both the "dry" and the "wet" breaking strength of the capsules.

For certain purposes, for instance, coloring of oleomargarine, it is desirable to provide capsules having a high "dry" breaking strength and a low "wet" breaking strength. When dry, such capsules are strong enough to be handled, stored and shipped. When moist, the capsules are weak enough (but still resilient) to be broken by manual pressure. In the case of 6½ minim capsules, the "dry" breaking strength should be at least 500 grams and preferably about 1000 grams, although the "dry" breaking strength may range as high as 2000 grams or higher. The "wet" breaking strength should range from 200 grams to 1000 grams, a value of about 500 grams being preferred. For preparing such capsules, an emulsion should be used containing about 20% to 65% of formaldehyde solution, preferably about 50%.

The amount of emulsion used must be sufficient to insure uniform effect of the formaldehyde on the capsules, as illustrated by the following experiment wherein two batches (made from the composition of Experiment 1) of 20,000 capsules each were tumbled, respectively, with 200 grams and 100 grams of an emulsion containing 50% of 37% aqueous formaldehyde, 20% lanolin and 30% light mineral oil for 30 minutes.

Table 2

| Drying Time, in Hours | Breaking Strength | |
|---|---|---|
| | 200 grams Emulsion | 100 grams Emulsion |
| 16 | 2,400 | 1,500 |
| 24 | 2,000 | 900 |
| 40 | 1,800 | 700 |
| 90 | 1,250 | 2,100 |
| 90+24 [1] | 420 | 400 |

[1] At 80% R. H.

As shown in Table 2, the results obtained when using 100 grams of emulsion are quite erratic, probably due to the fact that each capsule in the lot has not been affected exactly to the same extent as other capsules.

The time of tumbling of the capsules with the emulsion makes some difference but is ordinarily not critical, as shown by the experiment of Table 3 hereinbelow. In this experiment, capsules made of the same composition as those of Experiments 1 and 2 were tumbled with 200 grams of emulsion for each 20,000 capsules for various lengths of time. By way of comparison, "dry" breaking strengths are given both for treated and untreated capsules.

Table 3

| Drying Time, in Hours | Breaking Strength, in Grams | | | | |
|---|---|---|---|---|---|
| | Untreated Capsules | Treated Capsules, Tumbling Time, in Minutes | | | |
| | | 5 | 10 | 20 | 30 |
| 0 | 2,000 | 7,700 | 7,600 | 8,100 | 6,470 |
| 16 | 10,000 | 3,700 | 3,500 | 2,900 | 2,400 |
| 24 | 9,000 | 2,300 | 2,300 | 2,000 | 2,000 |
| 40 | 10,000 | 2,000 | 2,000 | 1,500 | 1,800 |
| 90 | 9,000 | 1,750 | 1,400 | 1,300 | 1,250 |

As shown, more prolonged tumbling tends to reduce the "dry" breaking strength somewhat. We prefer to tumble for at least 20 minutes, for the practical reason that by this time most of the formaldehyde fumes have been dissipated so that the capsules are more easily handled.

The influence of the gelatin to plasticizer ratio in the composition making up the capsules is quite important, as illustrated in the experiment of Table 5 where the ratio of gelatin to glycerin is varied. Batches of 20,000 capsules each were tumbled for 30 minutes with 200 grams of an emulsion containing 50% of 37% aqueous formaldehyde, 20% lanolin and 3.0% light mineral oil.

In the experiment of Table 5, gelatin compositions were used made up of the following ingredients:

Table 4

| Composition | Per Cent Gelatin | Per Cent Glycerin | Per Cent Water | Ratio, Gelatin-Glycerin |
|---|---|---|---|---|
| 1 | 39.060 | 19.057 | 41.983 | 2.05 |
| 2 | 37.530 | 22.135 | 40.435 | 1.696 |
| 3 | 36.000 | 25.080 | 38.390 | 1.435 |
| 4 | 34.605 | 27.787 | 37.708 | 1.245 |
| 5 | 27.0 | 47.5 | 25.5 | 0.568 |

In Table 4 and elsewhere in this specification, and in the claims, the percentages of gelatin, glycerin and water specified for the capsule-forming compositions are absolute percentages. For instance, in the case of the water, the percentage indicates the total water content including the water added as such, the moisture content of the gelatin (ordinarily about 9% to 13% and commonly about 11%) and the water content of the glycerin (in the case of U. S. P. glycerin, 5%). Gelatin and glycerin percentages indicate these substances in water-free form. Thus, Composition 5 of Table 4 (which includes a total water content of 25.5%) may be made up by adding about 20% water to gelatin of 11% moisture content and U. S. P. glycerin of 5% water content.

*Table 5*

| Ratio, Gelatin-Glycerin | Breaking Strength in Grams | | |
|---|---|---|---|
| | After 90 Hours Drying at 80° F. | After 90 Hours Drying+90 Hours at 80% R. H. | After 90 Hours Drying+3 min. Immersion in water at 20° C. |
| 2.05 | 10,000 | 3,500 | 1,000 |
| 1.696 | 10,000 | 2,500 | 600 |
| 1.435 | 9,000 | 2,200 | 500 |
| 1.245 | 10,000 | 1,000 | 1,000 |
| 0.674 | 1,700 | 300 | 300 |
| 0.568 | 1,250 | 250 | 250 |

As shown by the data in Tables 4 and 5, a high ratio of gelatin to glycerin brings about both a high "dry" and a high "wet" breaking strength, while the reverse is true of a low ratio. When both high "dry" strength and intermediate or low "wet" strength are desired (as in the case of capsules to be used for coloring oleomargarine), the emulsion should contain more than 20% but less than 65% formaldehyde solution and the gelatin to glycerin ratio should amount to about 0.5 to 1.5.

Attention is directed to the fact that the "wet" strengths of Table 5 have been determined after 90 hours at 80% relative humidity, while those of Table 1 were determined after 24 hours at 80% relative humidity. These values in the two tables are therefore not strictly comparable.

Another point of interest brought out by the data of figure 5 is the effect of immersion in water on the treated capsules. As shown, such immersion greatly reduces the breaking strength, but the resiliency of the capsules is not destroyed. Thus, even capsules of very great "dry" breaking strength can be rendered breakable by manual pressure by immersion in water, if so desired.

The characteristic changes in breaking strength brought about by changes in moisture content of capsules treated according to the present invention are clearly brought out by the data in Table 6. In the experiment of Table 6, capsules were prepared and treated as in the experiment of Table 1 with an emulsion containing 50% of 37% aqueous formaldehyde. The breaking strength of the capsules was determined from time to time as the capsules were first dried at 80° F. and a relative humidity of 25% for 90 hours, then stored for three weeks at room temperature at a relative humidity of 25%, thereafter kept for 25 hours at a relative humidity of 80% and finally kept in a desiccator over phosphorus pentoxide for 15 hours.

*Table 6*

| Condition | Time (hours) Elapsed under Specific Condition | Total Time (Hours) Elapsed | Breaking Strength (grams) |
|---|---|---|---|
| 80° F. + 25% R. H. | 0 | 0 | 6,470 |
| Do | 1½ | 1½ | 4,000 |
| Do | 5 | 5 | 3,200 |
| Do | 10 | 10 | 2,700 |
| Do | 15 | 15 | 2,400 |
| Do | 20 | 20 | 2,200 |
| Do | 25 | 25 | 2,000 |
| Do | 30 | 30 | 1,900 |
| Do | 35 | 35 | 1,820 |
| Do | 40 | 40 | 1,800 |
| Do | 90 | 90 | 1,250 |
| Room Temp. + 25% R. H. | 0 | 90 | 1,250 |
| Do | 504 | 594 | 1,140 |
| Room Temp. + 80% R. H. | 0 | 594 | 1,140 |
| Do | 5 | 599 | 560 |
| Do | 10 | 604 | 480 |
| Do | 15 | 609 | 440 |
| Do | 20 | 614 | 430 |
| Do | 25 | 619 | 420 |
| Room Temp. P₂O₅ | 0 | 619 | 420 |
| Do | 5 | 624 | 500 |
| Do | 10 | 629 | 750 |
| Do | 15 | 634 | 1,070 |

As shown by the tabulated data, the initial drying reduces the breaking strength from about 6400 grams to 1250 grams. A further slight reduction to 1140 grams occurs during dry storage. Exposure to a humid atmosphere reduces the breaking strength to 420 grams, but dehydration over phosphorus pentoxide rapidly restores the breaking strength to a value of 1070 grams. Note that breaking strength and resiliency are not completely lost on humidification and are rapidly recovered on dehydration. Further, on dehydration after humidification, the capsules are not distorted, as by formation of dimples. In the case of conventional capsules, on the other hand, humidification causes objectionable swelling, or even bursting, and subsequent dehydration often brings about distortion.

It will thus be seen that we have provided a method for treating capsules made up of aqueous plasticized gelatin compositions whereby the capsules are rendered initially strong and whereby the breaking strength can be varied at will by changing the humidity conditions to which the capsules are subjected.

In general, our process may be described as directed to the treatment of gelatin capsules in which the gelatin to plasticizer (or gelatin to glycerin) ratio does not exceed 1.5 and does not fall below 0.5. The treatment may be said to include contacting the capsules, preferably by tumbling, with an emulsion of aqueous formaldehyde for at least a few minutes (2 or 3 minutes). There is no critical upper limit for the contact time, although, of course, when small amounts of emulsion are used, the exhaustion of the formaldehyde content may render longer contact times pointless. The emulsion may contain about from 20 to 60% aqueous formaldehyde solution of at least 10% strength, preferably at least 35%. A sufficient amount of emulsion should be used to insure uniform action on the capsules. In the case of 6½ minim capsules, more than 1 gram of emulsion should be used for each 200 capsules. For capsules of other sizes, amounts of emulsion should be used in proportion to the surface of the capsules to be treated. Dehydration after treatment may be effected either by drying at a slightly elevated temperature in a dry atmosphere or by treatment with a water absorbent liquid such as acetone.

Many details of composition and procedure can be varied within a wide range without departing from the principles of this invention and it is therefore not our purpose to limit the patent granted on this invention otherwise than necessitated by the scope of the appended claims.

We claim:

1. A method of treating capsules made up of an aqueous composition comprising from about 25% to 42% water together with gelatin and glycerin in a ratio ranging from 0.5 to 1.5, said method comprising tumbling said capsules having said water content for at least about two minutes with an aqueous emulsion containing from 20% to 65% of aqueous formaldehyde of at least 10% strength dispersed in a water-immiscible non-volatile oil.

2. A method of treating capsules made up of an aqueous composition comprising gelatin and glycerin in a ratio ranging from 0.5 to 1.5 and containing from about 25% to 42% water, said method comprising tumbling said capsules having said water content for at least about two minutes with an aqueous emulsion containing from 20% to 65% of aqueous formaldehyde of at least 10% strength dispersed in a water-immiscible non-volatile oil and thereafter reducing the water content of said capsules substantially below the amount of water present in said capsules before said tumbling.

3. A method of treating capsules made up of an aqueous composition comprising gelatin and glycerin in a ratio ranging from 0.5 to 1.5 and containing from about 25% to about 42% water, said method comprising tumbling said capsules having said water content for at least about two minutes with an aqueous emulsion containing from 20% to 65% of aqueous formaldehyde of at least 10% strength dispersed in a water-immiscible non-volatile oil, thereafter reducing the water content of said capsules substantially below the amount of water present in said capsules before said tumbling, and thereafter maintaining the dehydrated capsules in a dry atmosphere.

4. Capsules made up of an aqueous composition comprising gelatin and glycerin in a ratio ranging from 0.5 to 1.5 and characterized by relatively high breaking strength when containing relatively small amounts of moisture and characterized by a relatively low breaking strength when containing relatively large amounts of moisture, said capsules having been prepared according to the method of claim 1.

5. A method according to claim 1 for treating edible capsules comprising after said tumbling removing residual oily emulsion from said capsules by contacting said capsules with sponges saturated with naphtha.

BLASEY T. PALERMO.
SHELBY C. McMILLION.

REFERENCES CITED

The following references are of record in the file of this patent:

UNITED STATES PATENTS

| Number | Name | Date |
|---|---|---|
| 1,898,507 | Stein | Feb. 21, 1933 |
| 2,255,694 | Beale | Sept. 9, 1941 |